(12) United States Patent
Nyalamadugu et al.

(10) Patent No.: US 9,996,791 B2
(45) Date of Patent: *Jun. 12, 2018

(54) RADIO FREQUENCY IDENTIFICATION ENABLED MIRRORS

(71) Applicant: NEOLOGY, INC., Poway, CA (US)

(72) Inventors: Sheshi Nyalamadugu, San Diego, CA (US); Joe Mullis, Escondido, CA (US)

(73) Assignee: Neology, Inc., Poway, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/633,400

(22) Filed: Jun. 26, 2017

(65) Prior Publication Data

US 2017/0300802 A1    Oct. 19, 2017

Related U.S. Application Data

(63) Continuation of application No. 14/927,426, filed on Oct. 29, 2015, now Pat. No. 9,688,202.

(60) Provisional application No. 62/072,416, filed on Oct. 29, 2014.

(51) Int. Cl.
| | |
|---|---|
| *G06K 19/077* | (2006.01) |
| *H01Q 1/22* | (2006.01) |
| *G02B 5/08* | (2006.01) |
| *B60R 1/12* | (2006.01) |
| *H01Q 1/32* | (2006.01) |
| *H01Q 1/38* | (2006.01) |
| *H01Q 7/00* | (2006.01) |
| *H01Q 13/10* | (2006.01) |
| *H01Q 5/378* | (2015.01) |
| *H01Q 15/14* | (2006.01) |

(52) U.S. Cl.
CPC .......... *G06K 19/07794* (2013.01); *B60R 1/12* (2013.01); *G02B 5/0875* (2013.01); *H01Q 1/2225* (2013.01); *H01Q 1/3266* (2013.01); *H01Q 1/38* (2013.01); *H01Q 5/378* (2015.01); *H01Q 7/00* (2013.01); *H01Q 13/106* (2013.01); *H01Q 15/14* (2013.01); *B60R 2001/1261* (2013.01); *B60R 2001/1276* (2013.01); *G02B 5/085* (2013.01)

(58) Field of Classification Search
USPC .......................... 235/492; 343/707, 712, 713
See application file for complete search history.

(56) References Cited

U.S. PATENT DOCUMENTS

| | | |
|---|---|---|
| 2002/0126054 A1 | 9/2002 | Fuerst et al. |
| 2004/0164865 A1 | 8/2004 | de Velasco Cortina |
| 2006/0028344 A1 | 2/2006 | Forster |
| 2009/0079568 A1 | 3/2009 | Forster et al. |
| 2010/0090833 A1 | 4/2010 | Mullis et al. |

(Continued)

OTHER PUBLICATIONS

International Search Report and Written Opinion received in PCT/US2015/058163 dated Jan. 29, 2016, 9 pages.

*Primary Examiner* — Allyson Trail
(74) *Attorney, Agent, or Firm* — Procopio, Cory, Hargreaves & Savitch, LLP

(57) ABSTRACT

A radio frequency identification (RFID) enabled mirror includes a mirror comprising a reflective layer. The reflective layer comprises at least one layer of a metallic material. At least one portion of the reflective layer is removed to form a booster antenna from a remaining portion of the reflective layer. A dielectric coating is applied to the mirror where the reflective layer was removed. The RFID-enabled mirror further includes an RFID chip coupled to the booster antenna.

20 Claims, 6 Drawing Sheets

(56) References Cited

U.S. PATENT DOCUMENTS

| | | |
|---|---|---|
| 2011/0169701 A1 | 7/2011 | Bergsmann et al. |
| 2012/0056791 A1 | 3/2012 | Cisneros Gonzales et al. |
| 2012/0267434 A1 | 10/2012 | Kohla et al. |
| 2013/0222156 A1 | 8/2013 | Colburn |
| 2015/0002262 A1 | 1/2015 | Geerlings et al. |

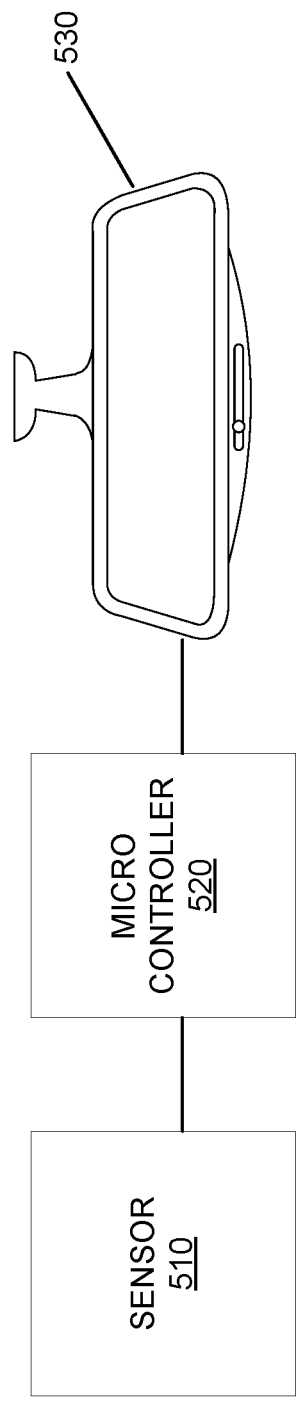

RADIO FREQUENCY IDENTIFICATION ENABLED MIRRORS

RELATED APPLICATIONS

This patent application is a continuation of U.S. patent application Ser. No. 14/927,426 entitled "RADIO FREQUENCY IDENTIFICATION ENABLED MIRRORS" and filed on Oct. 29, 2015, which claims the benefit under 35 U.S.C. § 119(e) to U.S. Provisional Patent Application No. 62/072,416, entitled "RADIO FREQUENCY IDENTIFICATION ENABLED MIRRORS" filed on Oct. 29, 2014, the disclosures of which are incorporated herein by reference in their entirety as a part of this document.

BACKGROUND

1. Technical Field

The various embodiments described herein are related to wireless devices, and more particularly to radio frequency identification (RFID) enabled mirrors.

2. Related Art

Radio frequency identification (RFID) technology plays a significant role in the regulation of motor vehicles and the provision of related services. For example, modern electronic toll systems (ETSs) and parking garages both rely heavily on RFID transponders. Thus, vehicles nowadays commonly carry an RFID transponder. The RFID transponder can communicate with RFID readers to provide data (e.g., one or more identifiers) that allows the ETS or parking authority to identify and/or debit an appropriate account.

The placement of conventional RFID transponders tends to be obtrusive. For example, a conventional RFID transponder may be mounted on the vehicle's windshield or dashboard. As such, the RFID transponder can obstruct the driver's line-of-sight and interfere with the aesthetic of the vehicle. Therefore, what is needed is an RFID transponder that can be integrated as a component of the vehicle.

SUMMARY

Radio frequency identification enabled mirrors are provided.

According to various embodiments, there is provided an RFID-enabled mirror. The RFID-enabled mirror includes a mirror comprising a reflective layer, wherein: the reflective layer comprises at least one layer of a metallic material; at least one portion of the reflective layer is removed to form a booster antenna from a remaining portion of the reflective layer; and a dielectric coating is applied to the mirror where the reflective layer was removed. The RFID-enabled mirror further includes an RFID chip coupled to the booster antenna.

According to various embodiments, there is provided an RFID-enabled mirror. The RFID-enabled mirror includes a mirror comprising a reflective layer, wherein: the reflective layer comprises a dielectric coating; at least one portion of the reflective layer is removed; and a metallic material is applied to the mirror where the reflective layer was removed to form a booster antenna. The RFID-enabled mirror further includes an RFID chip coupled to the booster antenna.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which:

FIG. 5 illustrates a self-declaring system according to various embodiments.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Figure 1A:
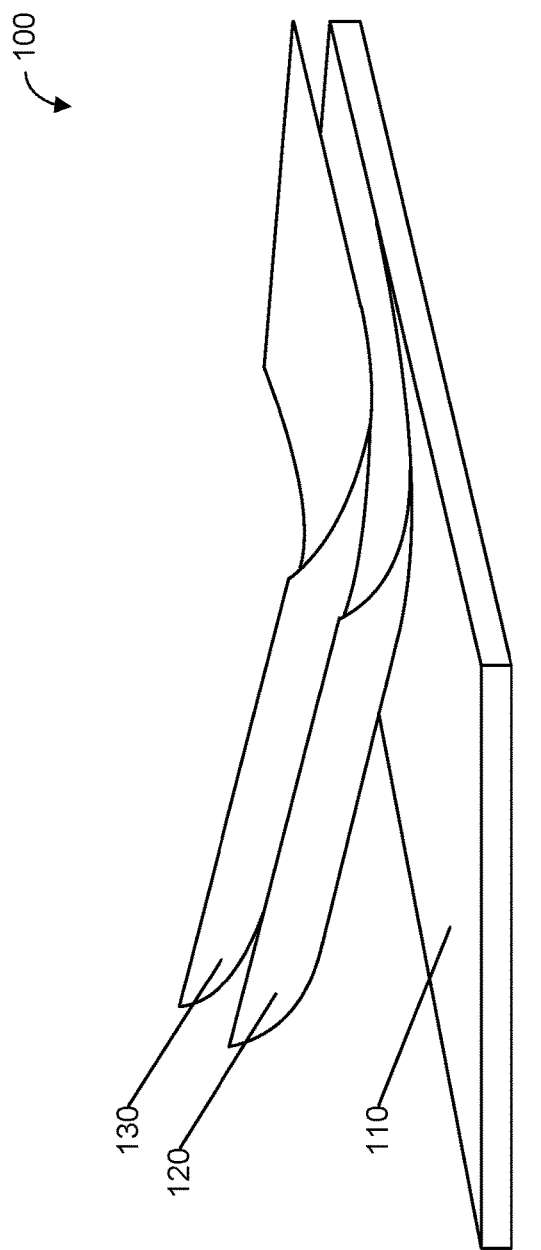
FIG. 1A illustrates a mirror according to various embodiments.
Figure 1B:
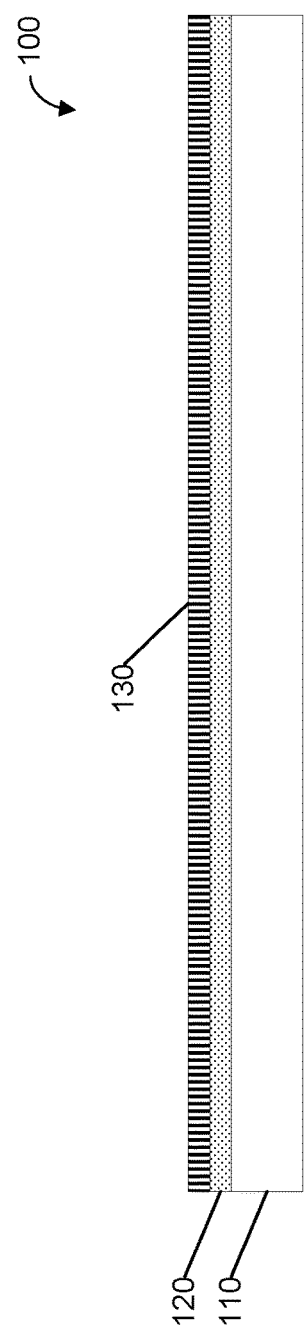
FIG. 1B illustrates a lateral cross-sectional view of a mirror according to various embodiments.

FIG. 1A illustrates a mirror 100 according to various embodiments. FIG. 1B illustrates a lateral cross-sectional view of the mirror 100 according to various embodiments. Referring to FIGS. 1A-B, the mirror 100 includes a substrate layer 110. In various embodiments, the substrate 100 can be any suitable transparent or substantially transparent material including, for example, but not limited to, glass, acrylic (i.e., polymethyl methacrylate (PMMA)), and polycarbonate (PC).

The mirror 100 further includes a reflective layer 120 that is deposited on top of the substrate layer 110. In some embodiments, the reflective layer 120 can include at least one layer of a suitable metal or metal alloy including, for example, but not limited to, aluminum (Al), silver (Ag), and speculum metal (i.e., cooper (Cu) and tin (Sn) alloy).

In some embodiments, the reflective layer 120 can include multiple layers of the same or different metals. For example, in some embodiments, the reflective layer 120 can include a layer of one metal (e.g., silver (Ag) or aluminum (Al)) deposited on top of the substrate layer 110 followed by a layer of a different metal (e.g., copper (Cu)).

Alternately or in addition, in some embodiments, the reflective layer 120 can include a dielectric coating. The dielectric coating can include stacked layers of transparent dielectric material adapted to modify the reflective properties of the substrate layer 110.

The mirror 100 further includes a protective layer 130 that is deposited on top of the reflective layer 120. For example, in some embodiments, the protective layer 130 can include a backing (e.g., paint) that is adapted to prevent exposure of the reflective layer 120 to corrosive substances (e.g., moisture, chemicals).

A person having ordinary skill in the art can appreciate that the mirror 100 can include additional and/or different components without departing from the scope of the present disclosure.

Figure 2A:
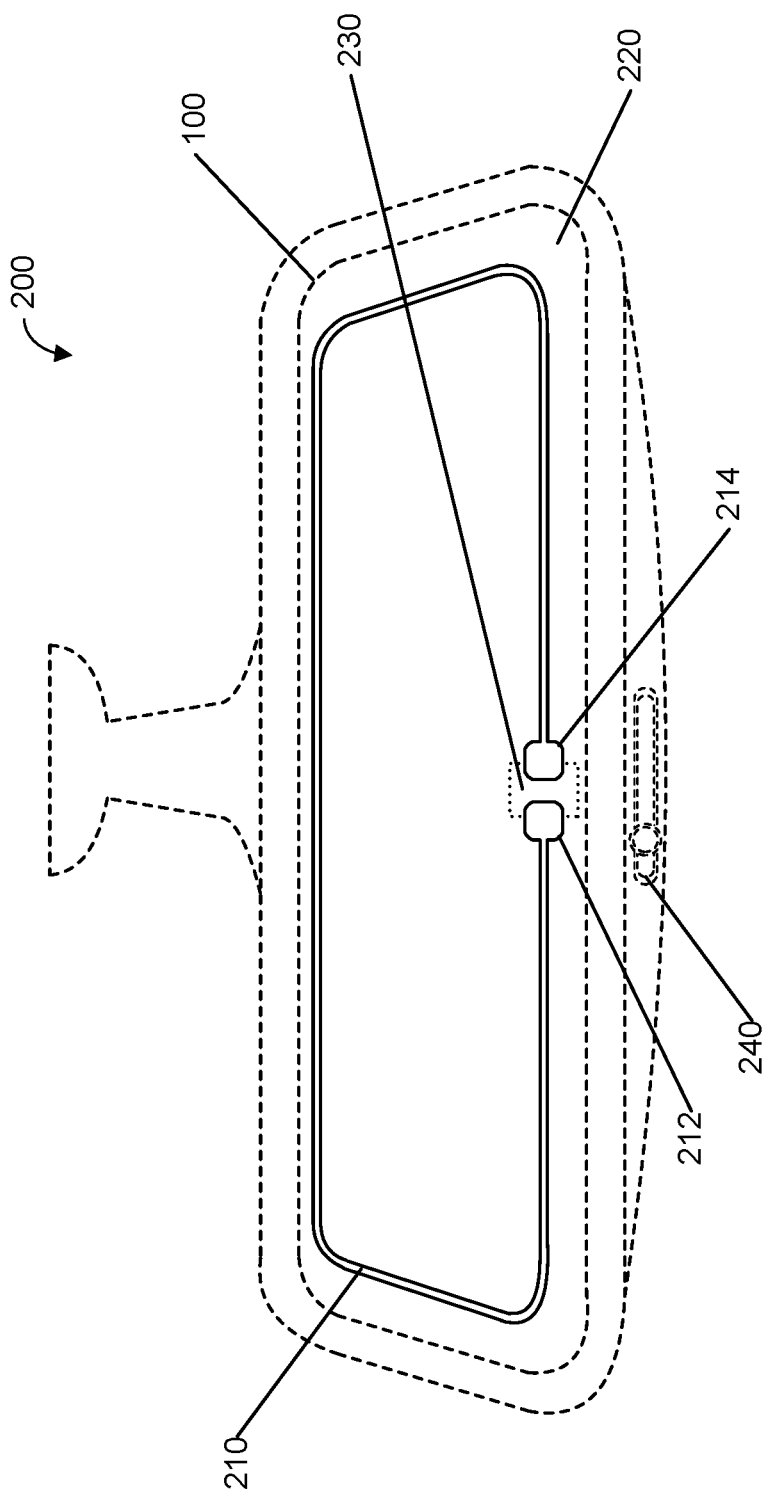
FIG. 2A illustrates an RFID-enabled mirror according to various embodiments.

FIG. 2A illustrates an RFID-enabled mirror 200 according to various embodiments. Referring to FIGS. 1A-B and 2A, the RFID-enabled mirror 200 includes the mirror 100. As shown in FIG. 2, in some embodiments, the RFID-enabled mirror 200 can be implemented as a rearview mirror. A person having ordinary skill in the art can appreciate that the RFID-enabled mirror 300 can be implemented as any suitable vehicle component (e.g., side view mirror) without departing from the scope of the present disclosure.

In various embodiments, a portion of the reflective layer 120 of the mirror 100 is selectively removed in order to form a booster antenna 210. For example, in some embodiments, the reflective layer 120 can include at least one metal or metal alloy layer (e.g., aluminum (Al), silver (Ag), and speculum metal). As such, the reflective layer 120 can be subject to a selective demetallization procedure adapted to remove a portion of the metal or metal alloy layer. A portion of the metal or metal alloy layer that remains after the selective demetallization procedure corresponds to a silhouette of the booster antenna 210.

One embodiment of a selective demetallization procedure is described in detail in co-owned U.S. Pat. No. 7,034,688 as well as U.S. Pat. No. 7,463,154, the disclosures of which are incorporated herein by reference in their entirety. For example, a demetallizing solution (e.g., sodium hydroxide (NaOH)) can be applied to the reflective layer 120 in order to remove a portion of the metal or metal alloy layer while preserving a portion of the metal or metal alloy layer that corresponds to the booster antenna 210.

Selectively demetallizing the reflective layer 120 to remove a portion of the metal or metal alloy layer can impair the reflective properties of the mirror 100. Thus, in various embodiments, a dielectric coating can be applied to substrate layer 110 of the mirror 100 to replace the removed portion of the metal or metal alloy layer in the reflective layer 120. As such, the mirror 100 can further include a dielectric section 220 providing the same or substantially the same reflective properties as the metal or metal alloy layer that has been removed.

Alternately, in some embodiments, the reflective layer 120 includes a dielectric coating that can be subject to a selective metallization procedure. For example, a portion of the reflective layer 120 that corresponds to a silhouette of the booster antenna 120 can be removed and a suitable metal or metal alloy (e.g., aluminum (Al), silver (Ag), and speculum metal) can be deposited to form the booster antenna 210. As such, the mirror 100 includes the metal or metal alloy booster antenna 210 and the dielectric section 220 that both provide the same or substantially the same reflective properties.

The booster antenna 210 is coupled to the RFID chip 230. For example, as shown in FIG. 2, the booster antenna 210 can be capacitively coupled to the RFID chip 230 via a first contact 212 and a second contact 214. However, a person having ordinary skill in the art can appreciate that the booster antenna 210 can be coupled to the RFID chip 230 in a different manner (e.g., inductively) without departing from the scope of the present disclosure.

In various embodiments, the booster antenna 310 can be configured to resonate at a suitable frequency band. For example, the booster antenna 310 can be adapted to resonate at an ultra-high frequency (UHF) band (e.g., 915 megahertz (MHz)), which enables the RFID-enabled mirror 200 to communicate with UHF systems and/or devices including, for example, but not limited to, RFID toll booth readers. Alternately, the booster antenna 310 can be adapted to resonate at a high frequency (HF) band (e.g., 13.5 MHz), which enables the RFID-enabled mirror 200 to communicate with an HF systems and/or device including, for example, but not limited to, a near field communication (NFC) enabled smartphone.

In some embodiments, the RFID-enabled mirror 200 can be coupled with a power source (not shown). For example, the RFID-enabled mirror 200 can include a battery or can be connected to an external power source (e.g., provided by a vehicle). As such, the RFID-enabled mirror 200 can be configured to provide one or more notifications (e.g., visual, audio). According to one exemplary embodiment, the RFID-enabled mirror 200 can be adapted to provide an audio notification (e.g., beep) and/or visual notification (e.g., light emitting diode (LED)) when a vehicle passes a toll booth and/or accesses a high occupancy toll (HOT) lane.

In various embodiments, the RFID-enabled mirror 200 can further include a switch 240. The switch 240 can be adapted to control one or more operational states of the RFID-enabled mirror 200 including, for example, but not limited to, activating and deactivating the RFID-enabled mirror 200. For example, in some embodiments, the RFID-enabled mirror 200 can be activated via the switch 240 when a single occupancy vehicle (SOV) enters HOT lane.

Additional details with respect to the switching mechanism are described in U.S. Pat. Nos. 8,844,831 and 8,944,337, and U.S. patent application Ser. Nos. 14/480,458 and 14/578,196, the disclosures of which are incorporated herein by reference in their entirety. For example, in some embodiments, the switch 240 can be adapted to control the operational states of the RFID-enabled mirror 200 by changing a position of the RFID chip 230 relative to the booster antenna 220.

In some embodiments, access to data stored by the RFID-enabled mirror 200 may be granted based on one or more security keys. Additional details with respect to security key based access control are described in U.S. Pat. No. 8,933,807, the disclosure of which is incorporated herein by reference in its entirety.

Although the booster antenna 210 is shown as a loop antenna, a person having ordinary skill in the art can appreciate that the booster antenna 210 can have any suitable configuration (e.g., slot antenna) without departing from the scope of the present disclosure.

Figure 2B:
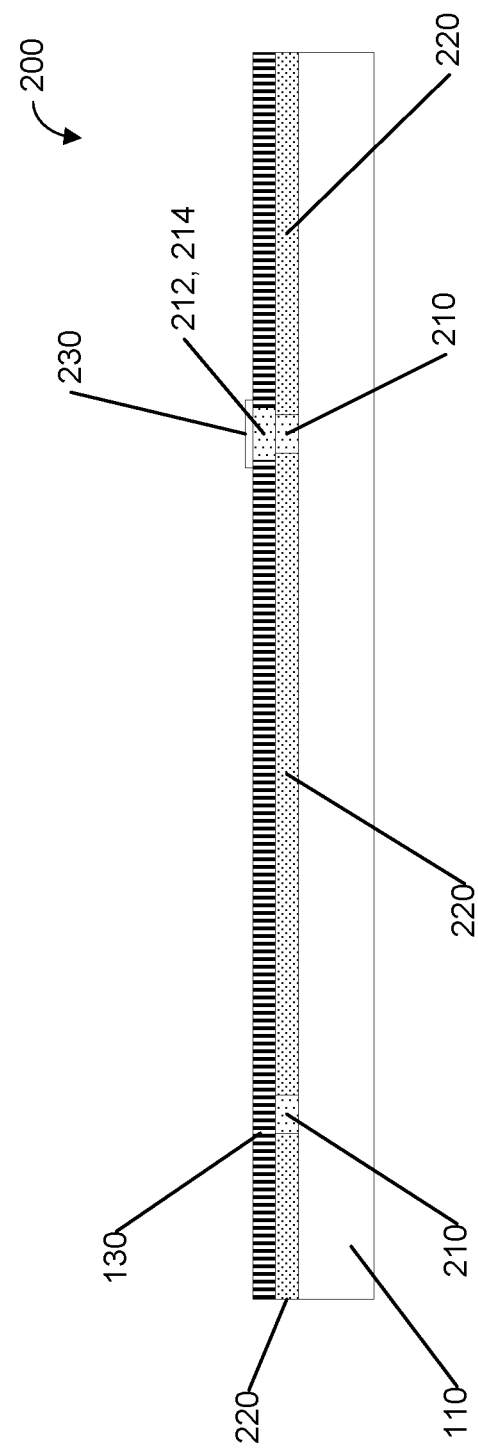
FIG. 2B illustrates a lateral cross-sectional view of the RFID-enabled mirror according to various embodiments.

FIG. 2B illustrates a lateral cross-sectional view of the RFID-enabled mirror 200 according to various embodiments. Referring to FIGS. 1A-B and 2A-B, the reflective layer 120 of the mirror 100 included in the RFID-enabled mirror 200 can be subject to selective demetallization or selective metallization to form the booster antenna 210. A dielectric coating is applied to the substrate 110 of the mirror 100 where metal or metal alloy was removed (i.e., selective demetallization) or was not deposited (i.e., selective metallization) to form the dielectric section 220. In various embodiments, the mirror 100 can further include the protective layer 130, which prevents exposure of the booster antenna 210 and the dielectric section 220 to corrosive substances (e.g., moisture, chemicals)

The RFID-enabled mirror 200 further includes the RFID chip 230 coupled with the booster antenna 210. For example, in some embodiments, the RFID chip 230 can be coupled (e.g., capacitively) with the booster antenna 210 via the first contact 212 and the second contact 214, which penetrate through a portion of the protective layer 130. Alternately, the RFID chip 230 can be coupled with the booster antenna 210 in a different manner (e.g., inductively) without departing from the scope of the present disclosure.

Figure 3:
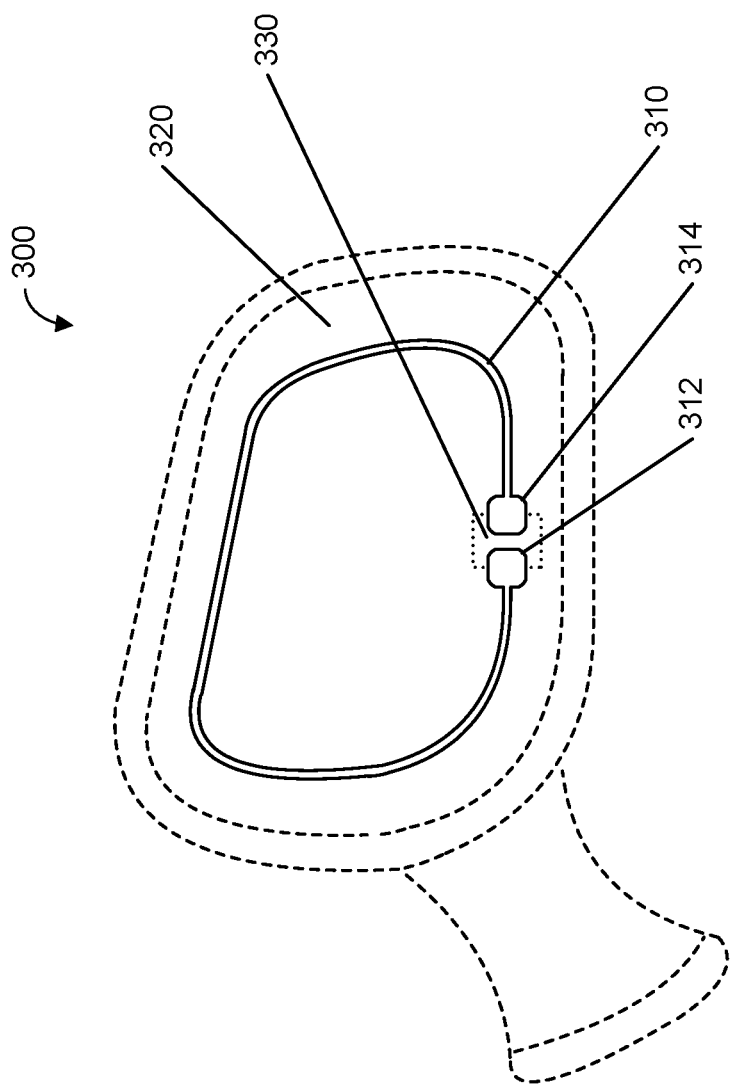
FIG. 3 illustrates an RFID-enabled mirror according to various embodiments.

FIG. 3 illustrates an RFID-enabled mirror 300 according to various embodiments. Referring to FIGS. 1A-B and 3, in some embodiments, the RFID-enabled mirror 300 may be implemented as a side view mirror. A person having ordinary skill in the art can appreciate that the RFID-enabled mirror 300 can be implemented as any suitable vehicle component (e.g., a rearview mirror) without departing from the scope of the present disclosure.

In various embodiments, the RFID-enabled mirror 300 includes the mirror 100. According to one exemplary embodiment, a booster antenna 310 is formed by subjecting the reflective layer 120 of the mirror 100 to a selective demetallization or a selective metallization procedure.

For example, in one embodiment, the booster antenna 310 is formed from a portion of a metal or metal alloy layer of the reflective layer 120 that remains after the reflective layer 120 is subject to a selective demetallization procedure. A dielectric coating is deposited to replace the removed metal or metal alloy layer. A resulting dielectric section 320 provides the same or substantially the same reflective properties as the metal or metal alloy layer that has been removed.

Alternately, in some embodiments, the booster antenna 310 is formed by removing a portion of a dielectric coating corresponding to a silhouette of the booster antenna 310 while preserving the dielectric section 330. Metal or metal alloy is deposited where the dielectric coating has been removed to from the booster antenna 310.

In various embodiments, the booster antenna 310 can be configured to resonate at a suitable frequency band (e.g., HF or UHF). The booster antenna 310 can be coupled (e.g., capacitively) to an RFID chip 330 via a first contact 312 and a second contact 314. However, the booster antenna 310 can be coupled to the RFID chip 330 in a different manner (e.g., inductively) without departing from the scope of the present disclosure.

In some embodiments, the RFID-enabled mirror 300 can be coupled with a power source (not shown). For example, the RFID-enabled mirror 300 can include a battery or can be connected to an external power source provided by a vehicle. As such, the RFID-enabled mirror 300 can be configured to provide one or more notifications (e.g., visual, audio). According to one exemplary embodiment, the RFID-enabled mirror 300 can be adapted to provide an audio notification (e.g., beep) and/or visual notification (e.g., LED) when a vehicle passes a toll booth and/or accesses an HOT lane.

Although the booster antenna 310 is shown as a loop antenna, a person having ordinary skill in the art can appreciate that the booster antenna 210 can have any suitable configuration (e.g., slot antenna) without departing from the scope of the present disclosure.

Figure 4:
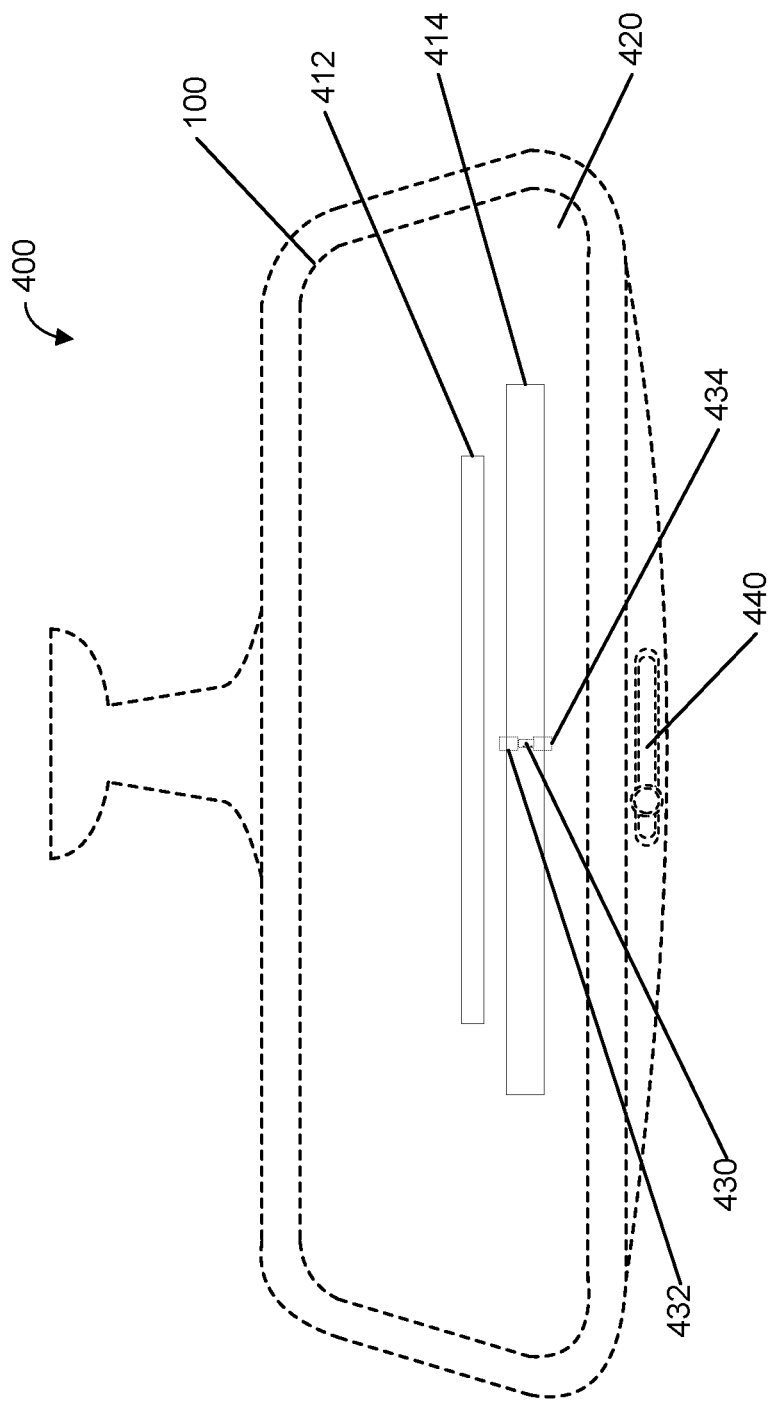
FIG. 4 illustrates a multi-frequency RFID-enabled mirror according to various embodiments.

FIG. 4 illustrates a multi-frequency RFID-enabled mirror 400 according to various embodiments. Referring to FIGS. 1A-B and 4, the multi-frequency RFID-enabled mirror 400 can be implemented as a rearview mirror. A person having ordinary skill in the art can appreciate that the RFID-enabled mirror 300 can be implemented as any suitable vehicle component (e.g., side view mirror) without departing from the scope of the present disclosure.

In various embodiments, the multi-frequency RFID-enabled mirror 400 can include the mirror 100. The mirror 100 can be subject to a selective demetallization procedure or a selective metallization procedure to form a booster antenna 420. In some embodiments, the booster antenna 420 can be a slot antenna having a plurality of slots including, for example, but not limited to, a first slot 412 and a second slot 414.

For example, in some embodiments, the reflective layer 120 of the mirror 100 can include a metal or a metal alloy layer (e.g., silver (Au), aluminum (Al), or speculum metal). To form the first slot 412 and the second slot 414, silhouettes corresponding to the first slot 412 and the second slot 414 can be selectively removed from the reflective layer 120. To preserve the reflective qualities of the mirror 100, a dielectric coating can be applied on the substrate layer 110 in the first slot 412 and the second slot 414 where the reflective layer 120 of the mirror 100 was removed. As such, the mirror 100 can include the booster antenna 420, which has a plurality of dielectric slots (e.g., the first slot 412 and the second slot 414).

Alternately, in some embodiments, the reflective layer 120 of the mirror 100 can include a dielectric coating. As such, a portion of the reflective layer 120 can be removed while preserving the first slot 412 and the second slot 414. A metal or a metal alloy layer can be deposited where the dielectric coating was removed to form the booster antenna 420.

An RFID strap 430 can be positioned across one of the plurality of slots (e.g., the second slot 414) and coupled with the booster antenna 420. For example, in some embodiments, the RFID strap 430 can be coupled (e.g., capacitively) with the booster antenna 420 via a first contact 432 and a second contact 434. However, the RFID strap 430 can also be coupled with booster antenna 420 in a different manner (e.g., inductively) without departing from the scope of the present disclosure.

According to one exemplary embodiment, the multi-frequency RFID-enabled mirror 400 is adapted to support a plurality of frequency bands. Thus, in various embodiments, the relative and respective dimensions, spacing, and location of each of the plurality of slots (e.g., the first slot 412 and the second slot 414) are configured such that the booster antenna 420 resonates at multiple frequency bands. For example, the booster antenna 420 can be adapted to resonate at a UHF band (e.g., 915 MHz) and at an HF band (e.g., 13.5 MHz). As such, the multi-frequency RFID-enabled mirror 400 is able to communicate with multiple RFID systems and/or devices including, for example, but not limited to, UHF systems or devices (e.g., RFID toll booth readers) and/or HF systems or devices (e.g., an NFC-enabled smartphone).

For example, in some embodiments, the multi-frequency RFID-enabled mirror 400 is able to communicate with UHF RFID readers installed at toll booths and parking garages. The multi-frequency RFID-enabled mirror 400 is further able to communicate with an NFC-enabled device (e.g., smartphone). As such, the multi-frequency RFID-enabled mirror 400 can provide data (e.g., one or more identifiers) to the UHF RFID readers that allow the ETS system or parking authority to identify and debit an appropriate account. The multi-frequency RFID-enabled mirror 400 can further provide data (e.g., one or more identifiers) to the NFC-enabled device allowing the NFC-enabled device to recharge the account (e.g., via an electronic wallet application). Additional details with respect to account management are described in U.S. patent application Ser. No. 14/459,299, the disclosure of which is incorporated herein by reference in its entirety.

In some embodiments, the multi-frequency RFID-enabled mirror 400 can be coupled with a power source (not shown). For example, the multi-frequency RFID-enabled mirror 400 can include a battery or can be connected to an external power source provided by a vehicle. As such, the multi-frequency RFID-enabled mirror 400 can be configured to provide one or more notifications (e.g., visual, audio). According to one exemplary embodiment, the multi-frequency RFID-enabled mirror 400 can be adapted to provide an audio notification (e.g., beep) and/or visual notification (e.g., LED) when a vehicle passes a toll booth and/or accesses an HOT lane.

In various embodiments, the multi-frequency RFID-enabled mirror 400 can further include a switch 440. The switch 440 can be adapted to control one or more operational states of the multi-frequency RFID-enabled mirror 400 including, for example, but not limited to, activating and deactivating the multi-frequency RFID-enabled mirror 400 with respect to at least one of the plurality of frequency bands (e.g., UHF, HF) supported by the multi-frequency RFID-enabled mirror 400.

Although the multi-frequency RFID-enabled mirror 400 is shown with the first slot 412 and the second slot 414, a person having ordinary skill in the art can appreciate that the multi-frequency RFID-enabled mirror 400 can include a different number of slots without departing from the scope of the present disclosure. Moreover, the multi-frequency RFID-enabled mirror 400 can include a plurality of slots (e.g., the first slot 412 and the second slot 414) having a different relative and respective dimension, spacing, and/or location than shown without departing from the scope of the present disclosure.

Additional details with respect to multi-frequency RFID devices are described in Reissued U.S. Pat. Nos. RE 43,335 and RE 44,691, the disclosures of which are incorporated by reference herein in their entirety.

FIG. 5 illustrates a self-declaring system 500 according to various embodiments. Referring to FIGS. 1A-B, 2A, 3, and 4, the self-declaring system 500 can include a sensor module 510, a microcontroller 520, and an RFID-enabled mirror 530. In various embodiments, the RFID-enabled mirror 530 can be implemented by the RFID enabled mirror 200, the RFID-enabled mirror 300, or the multi-frequency RFID-enabled mirror 400.

In various embodiments, the sensor module 510 can collect data that may be used to determine a number of occupants in a vehicle. For example, in some embodiments, the sensor module 1510 can include one or more sensors including, for example, but not limited to, a motion sensor, an infrared (IR) sensor, and an image recognition sensor.

In various embodiments, the sensor module 510 can transmit at least some of the collected data to the microcontroller 520. According to one exemplary embodiment, the micro controller 520 can be configured to determine a number of occupants in the vehicle based on the sensor data. In some embodiments, the microcontroller 520 can further determine whether the number of occupants in the vehicle exceeds a minimum number of occupants required for high occupancy vehicle (HOV) lane access in a given jurisdiction. For example, the micro controller 520 can determine, based on the sensor data, whether the vehicle is an SOV or an HOV.

In various embodiments, the microcontroller 520 is configured to control an operational state of the RFID-enabled mirror 530. For example, in some embodiments, the microcontroller 520 can change the operational state (e.g., activate and deactivate) of the RFID-enabled mirror 530 based on occupancy data. If the number of occupants in the vehicle does not exceed a certain number (e.g., one), the microcontroller 520 can be configured to activate the RFID-enabled mirror 530. Activating the RFID-enabled mirror 530 allows the RFID-enabled mirror 530 to communicate relevant data to an HOT lane reader (e.g., one or more identifiers allowing the ETS to identify and debit an appropriate toll account).

A person having ordinary skill in the art can appreciate that the sensor module 510, the micro controller 520, and the RFID-enabled mirror 530 can be coupled via one or more wired and/or wireless connections without departing from the scope of the present inventive concept. As such, in some embodiments, the sensor module 510, the micro controller 520, and the RFID-enabled mirror 530 may be installed in separate locations on a vehicle.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A radio frequency identification (RFID) enabled mirror, comprising:
    a mirror comprising a reflective layer, wherein the reflective layer comprises at least one layer of a metallic material, a first portion of the reflective layer is removed to form a first booster antenna from a remaining portion of the reflective layer, a second portion of the reflective layer is removed to form a second booster antenna from the remaining portion of the reflective layer;
    a dielectric coating is applied to the mirror where the first portion of the reflective layer and the second portion of the reflective layer were removed; and
    an RFID chip is coupled to the first booster antenna and the second booster antenna.

2. The RFID-enabled mirror of claim 1, wherein the RFID chip is coupled to the first booster antenna and the second booster antenna via one of an inductive coupling and a capacitive coupling.

3. The RFID-enabled mirror of claim 1, wherein the mirror further comprises a substrate, and wherein the reflective layer is deposited on the substrate.

4. The RFID-enabled mirror of claim 1, wherein at least one of the first booster antenna and the second booster antenna comprises a loop antenna.

5. The RFID-enabled mirror of claim 1, wherein at least one of the first booster antenna and the second booster antenna comprises a slot antenna having at least one slot corresponding to the removed first portion or the removed second portion of the reflective layer.

6. The RFID-enabled mirror of claim 1, wherein the first booster antenna is configured to resonate at a first frequency band.

7. The RFID-enabled mirror of claim 6, wherein the second booster antenna is configured to resonate at a second frequency band.

8. The RFID-enabled mirror of claim 1, wherein the RFID-enabled mirror comprises one of a rearview mirror and a side view mirror.

9. The RFID-enabled mirror of claim 1, wherein the dielectric coating comprises stacked layers of transparent dielectric material.

10. The RFID-enabled mirror of claim 9, further comprising a protective layer deposited on top of the reflective layer.

11. A radio frequency identification (RFID) enabled mirror, comprising:
    a mirror comprising a reflective layer, wherein:
    the reflective layer comprises a dielectric coating;
    at least a first portion and a second portion of the reflective layer are removed; and
    a metallic material is applied to the mirror where the first portion and the second portion of the reflective layer were removed to form a first booster antenna and a second booster antenna; and
    an RFID chip is coupled to the first booster antenna and the second booster antenna.

12. The RFID-enabled mirror of claim 11, wherein the RFID chip is coupled to at least one of the first booster antenna and the second booster antenna via one of an inductive coupling and a capacitive coupling.

13. The RFID-enabled mirror of claim 11, wherein the mirror further comprises a substrate, and wherein the reflective layer is deposited on the substrate.

14. The RFID-enabled mirror of claim 11, wherein at least one of the first booster antenna and the second booster antenna comprises a loop antenna.

15. The RFID-enabled mirror of claim 11, wherein at least one of the first booster antenna and the second booster antenna comprises a slot antenna having at least one slot corresponding to the removed first portion or the removed second portion of the reflective layer.

16. The RFID-enabled mirror of claim 11, wherein the first booster antenna is configured to resonate at a first frequency band and the second booster antenna is configured to resonate at a second frequency band.

17. The RFID-enabled mirror of claim 11, wherein the dielectric coating comprises stacked layers of transparent dielectric material.

18. The RFID-enabled mirror of claim 11, further comprising a protective layer deposited on top of the reflective layer.

19. The RFID-enabled mirror of claim 11, further comprising a switch adapted to control an operational state of the RFID-enabled mirror.

20. The RFID-enabled mirror of claim 19, wherein the operational state of the RFID-enabled mirror corresponds to a number of occupants in a vehicle.

* * * * *